United States Patent
Feng et al.

(10) Patent No.: US 10,063,582 B1
(45) Date of Patent: Aug. 28, 2018

(54) SECURING COMPROMISED NETWORK DEVICES IN A NETWORK

(71) Applicant: SYMANTEC CORPORATION, Mountain View, CA (US)

(72) Inventors: Wangyan Feng, Sunnyvale, CA (US); Shuning Wu, Mountain View, CA (US); Yufei Han, Antibes (FR); Yun Shen, Bristol (GB)

(73) Assignee: SYMANTEC CORPORATION, Mountain View, CA (US)

( * ) Notice: Subject to any disclaimer, the term of this patent is extended or adjusted under 35 U.S.C. 154(b) by 0 days.

(21) Appl. No.: 15/609,689

(22) Filed: May 31, 2017

(51) Int. Cl.
 *H04L 29/06* (2006.01)
 *G06N 99/00* (2010.01)
 *G06N 7/00* (2006.01)

(52) U.S. Cl.
 CPC ......... *H04L 63/1433* (2013.01); *G06N 7/005* (2013.01); *G06N 99/005* (2013.01)

(58) Field of Classification Search
 CPC ... H04L 63/1433; G06N 7/005; G06N 99/005
 See application file for complete search history.

(56) References Cited

U.S. PATENT DOCUMENTS 7,444,309 B2 * 10/2008 Branke .................. G06N 3/126
 706/13

OTHER PUBLICATIONS

Antonio Bianchi et al., "Blacksheep: Detecting Compromised Hosts in Homogenous Crowds", 19th ACM Conference on Computer and Communications Security, Oct. 16-18, 2012, 12 pgs.

Yinglian Xie et al., (2004) Seurat: A Pointillist Approach to Anomaly Detection. In: Jonsson E., Valdes A., Almgren M. (eds) Recent Advances in Intrusion Detection. RAID 2004. Lecture Notes in Computer Science, vol. 3224. Springer, Berlin, Heidelberg, 20 pgs.

Ting-Fang Yen, "Detecting Stealthy Malware Using Behavioral Features in Network Traffic", Aug. 2011, 123 pgs.

* cited by examiner

*Primary Examiner* — Kyoung Lee
(74) *Attorney, Agent, or Firm* — Maschoff Brennan

(57) ABSTRACT

Securing compromised network devices in a network. In one embodiment, a method may include (a) identifying a Positive Unlabeled (PU) machine learning classifier, (b) selecting labeled positive samples and unlabeled positive and negative samples as a bootstrap subset of training data from a set of training data, (c) training the PU machine learning classifier, (d) repeating (a)-(c) one or more times to create a set of trained PU machine learning classifiers, (e) predicting probabilities that a network device in a network has been compromised using each of the trained PU machine learning classifiers, (f) combining the probabilities predicted at (e) to generate a combined risk score for the network device, (g) repeating (e)-(f) one or more times to create a ranked list of combined risk scores, and (h) performing a security action on one or more of the network devices in the ranked list.

20 Claims, 4 Drawing Sheets

SECURING COMPROMISED NETWORK DEVICES IN A NETWORK

BACKGROUND

Many modern organizations have a security operations center (SOC) to deal with security issues on an organizational and technical level. An SOC may be a centralized unit where security application and/or network administrators supervise, among other things, the organization's network and network devices to monitor for, investigate, and defend from potential threats. For example, the SOC may be tasked with monitoring network devices using security applications that alert SOC network administrators each time that a network device is suspected of having been compromised from a security standpoint. For example, a network device may be compromised by being infected with a malicious application such as a virus or a malware.

Unfortunately, however, the task of monitoring a network for every potential instance of a network device being compromised can be very difficult in modern network environments. This difficulty may arise due to the relatively high number of network devices on modern networks and the relatively high number of potentially threatening circumstances that may arise on any given day on the network devices. For example, a large organization may have tens of thousands of network devices connected to its network and the SOC network administrators of the large organization may receive millions of alerts each day to investigate network devices that are suspected of having been compromised. The sheer volume of alerts received in this example makes it impossible for the SOC network administrators to investigate and defend against all but a very small percentage of the alerts, which are often selected at random or based on some rudimentary rules-based ranking, leaving all other alerts uninvestigated. The relatively high number of uninvestigated alerts may result in network devices that were actually compromised remaining unaddressed by network administrators, which leaves the network vulnerable.

The subject matter claimed herein is not limited to embodiments that solve any disadvantages or that operate only in environments such as those described above. Rather, this background is only provided to illustrate one example technology area where some embodiments described herein may be practiced.

SUMMARY

In one embodiment, a computer-implemented method for securing compromised network devices in a network may be performed, at least in part, by a computing device including at least one processor. The method may include (a) identifying a Positive Unlabeled (PU) machine learning classifier. The method may further include (b) selecting labeled positive samples and unlabeled positive and negative samples as a bootstrap subset of training data from a set of training data. The method may also include (c) training the PU machine learning classifier with the bootstrap subset of training data. The method may further include (d) repeating (a)-(c) one or more times to create a set of trained PU machine learning classifiers. The method may also include (e) predicting probabilities that a network device in a network has been compromised using each of the trained PU machine learning classifiers in the set of trained PU machine learning classifiers. The method may further include (f) combining the probabilities predicted at (e) to generate a combined risk score for the network device. The method may also include (g) repeating (e)-(f) one or more times to create a ranked list of combined risk scores. The method may further include (h) performing a security action on one or more of the network devices in the ranked list.

In some embodiments, the PU machine learning classifier identified at (a) may include one or more of a logistic regression classifier, a Linear and Quadratic Discriminant Analysis (LDA/QDA) classifier, a Support Vector Machine (SVM) classifier, a decision tree classifier, a nearest neighbor classifier, a Naïve Bayes classifier, a neural network classifier, a deep neural network classifier, a deep belief network classifier, a random forest classifier, and a gradient boosted trees classifier. In some embodiments, the predicting of the probabilities that the network device in the network has been compromised may include predicting probabilities that the network device in the network has been infected with a malicious application. In some embodiments, a malicious application may include one or more of a spyware, a virus, a worm, a logic bomb, a trapdoor, a Trojan horse, a Remote Admin Trojan (RAT), a malware, a mobile malicious code, a malicious font, and a rootkit. In some embodiments, the set of training data may include fewer labeled positive samples than unlabeled positive and negative samples. In some embodiments, the data indicating the security posture of the network device comprises one or more of summary feature data, indicator feature data, temporal feature data, and relational feature data. In some embodiments, the labeled positive samples in the set of training data may be collected from network devices that have been confirmed to have been compromised and the unlabeled positive and negative samples in the set of training data may be collected from network devices that are suspected to have been compromised but have not been confirmed to have been compromised. In some embodiments, the method may be performed by a User Behavior Analytics (UBA) application and/or by a Security Information and Event Management (SIEM) application.

Also, in some embodiments, a type of the PU machine learning classifier identified in a first iteration of (a) may be different from a type of the PU machine learning classifier identified in a second iteration of (a). In some embodiments, each iteration of (b) may include selecting a different bootstrap subset of training data from the same set of training data. In some embodiments, each iteration of (b) may include selecting a different bootstrap subset of training data from the same set of training data. In some embodiments, (e) may include using data indicating a security posture of the network device in a network as input to each of the trained PU machine learning classifiers in the set of trained PU machine learning classifiers. In some embodiments, (f) may include combining the probabilities predicted at (e) by averaging the probabilities as the combined risk score for the network device. In some embodiments, (f) may include combining the probabilities predicted at (e) by taking the minimum or maximum of the probabilities as the combined risk score for the network device. In some embodiments, (f) may include combining the probabilities predicted at (e) by assigning each of the probabilities to a category and identifying the most frequent category as the combined risk score for the network device. In some embodiments, (f) may further include calibrating the combined risk score into a scale for display to a user. In some embodiments, (g) may further include presenting the ranked list of combined risk scores to a user. In some embodiments, (h) may include performing the security action on the one or more of the network devices positioned highest in the ranked list.

Further, in some embodiments, one or more non-transitory computer-readable media may include one or more computer-readable instructions that, when executed by one or more processors, cause the one or more processors to perform a method for securing compromised network devices in a network.

It is to be understood that both the foregoing summary and the following detailed description are explanatory and are not restrictive of the invention as claimed.

BRIEF DESCRIPTION OF THE DRAWINGS

Embodiments will be described and explained with additional specificity and detail through the use of the accompanying drawings in which.

DETAILED DESCRIPTION

Figure 1:
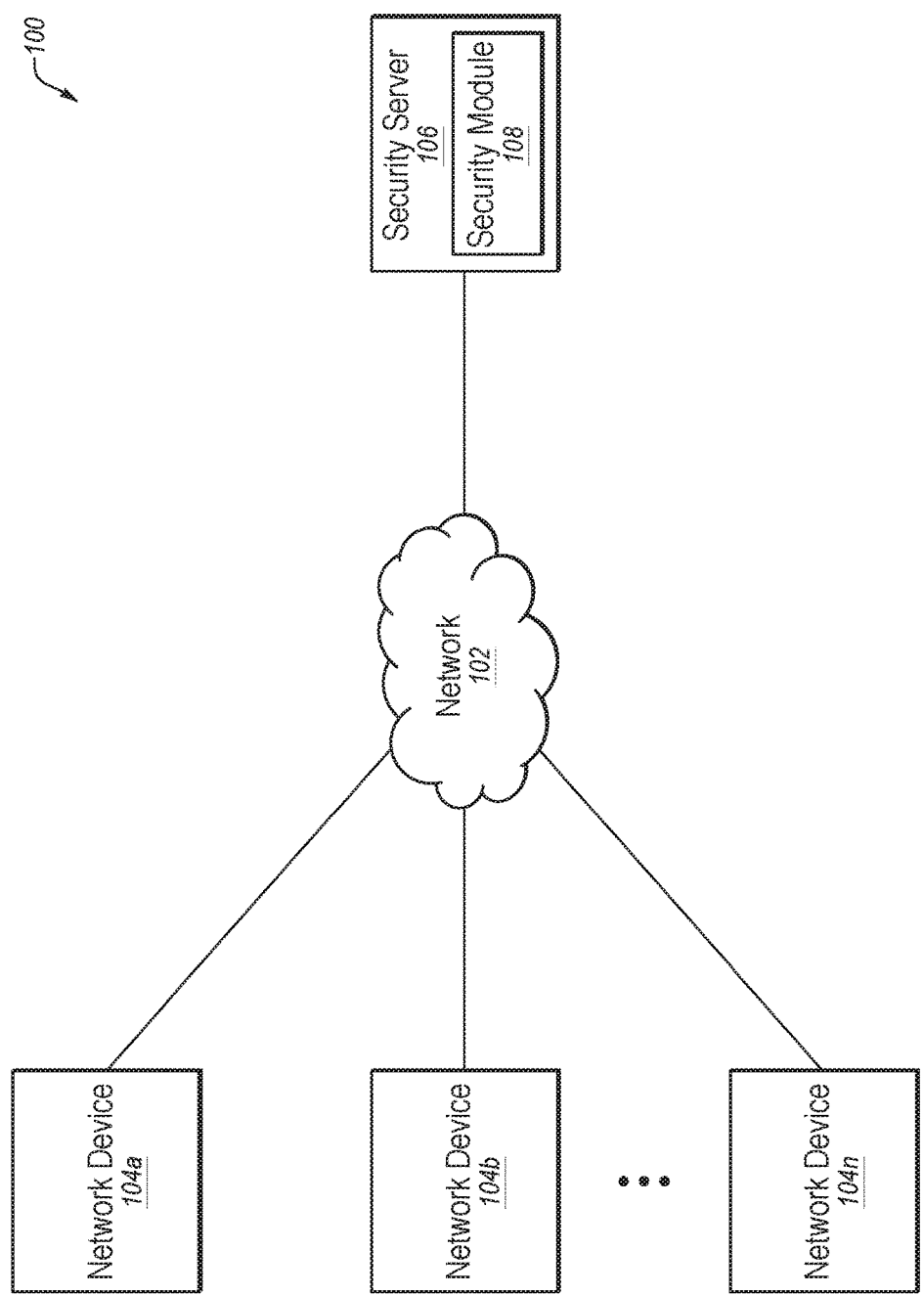
FIG. 1 illustrates an example system configured for securing compromised network devices in a network.

Some embodiments in this disclosure relate to securing compromised network devices in a network.

Network administrators tasked with monitoring for, investigating, and defending against potential threats on a network of an organization, such as security operations center (SOC) network administrators, may be unable to assess each potential threat. This inability may arise due to a relatively high number of network devices on the network and a relatively high number of potentially threatening circumstances that may arise on any given day on the network devices.

For example, the organization may have tens of thousands of network devices connected to its network and the SOC network administrators may receive millions of alerts each day to investigate network devices that are suspected of having been compromised. The sheer volume of alerts received in this example may make it impossible for the SOC network administrators to investigate and defend against all but a very small percentage of the alerts, leaving all other alerts uninvestigated. The relatively high number of uninvestigated alerts may result in actual compromised network devices remaining unaddressed, which leaves the network vulnerable.

The embodiments disclosed herein may provide various benefits. In particular, the embodiments disclosed herein may, for example, enable securing compromised network devices in a network.

In some embodiments, securing compromised network devices in a network may include first training Positive Unlabeled (PU) machine learning classifiers using training data that includes both labeled positive samples and unlabeled positive and negative samples. This training may be effective even where there are fewer positive labeled examples than unlabeled positive and negative samples (e.g. due to relatively few compromised network devices actually being identified as compared to other network devices for which it is unknown whether the machines have been compromised). Then, once a set of PU machine learning classifiers are trained, the PU machine learning classifiers may be employed to predict probabilities that one or more network devices in a network have been compromised. The predicted probabilities of each network device may then be combined into a combined risk score for the network device, and the combined risk scores for the network devices may be placed in a ranked list. A security module and/or network administrator may then employ the ranked list to investigate those network devices that have the highest combined risk scores, thus ensuring that the network devices with the highest probability of actually being compromised are addressed by the security module and/or network administrator.

Continuing with the example above, the embodiments disclosed herein may enable SOC network administrators who receive millions of alerts each day to prioritize their investigations to only those alerts that correspond to network devices that have the highest probability of actually being compromised. This may allow the limited time, energy, and resources of a limited number of SOC network administrators for investigating suspected network devices to be utilized in a more effective manner than conventional investigations that are random or based on a rudimentary rules-based ranking, thus leaving the network less vulnerable.

Turning to the figures, FIG. 1 illustrates an example system 100 configured for securing compromised network devices in a network. The system 100 may include a network 102, network devices 104a-104n, and a security server 106.

In some embodiments, the network 102 may be configured to communicatively couple the network devices 104a-104n to one another as well as to the security server 106. In some embodiments, the network 102 may be any wired or wireless network, or combination of multiple networks, configured to send and receive communications between systems and devices. In some embodiments, the network 102 may include a Personal Area Network (PAN), a Local Area Network (LAN), a Metropolitan Area Network (MAN), a Wide Area Network (WAN), a Storage Area Network (SAN), or some combination thereof. In some embodiments, the network 102 may also be coupled to, or may include, portions of a telecommunications network, including telephone lines, for sending data in a variety of different communication protocols, such as a cellular network or a Voice over IP (VoIP) network.

Figure 4:
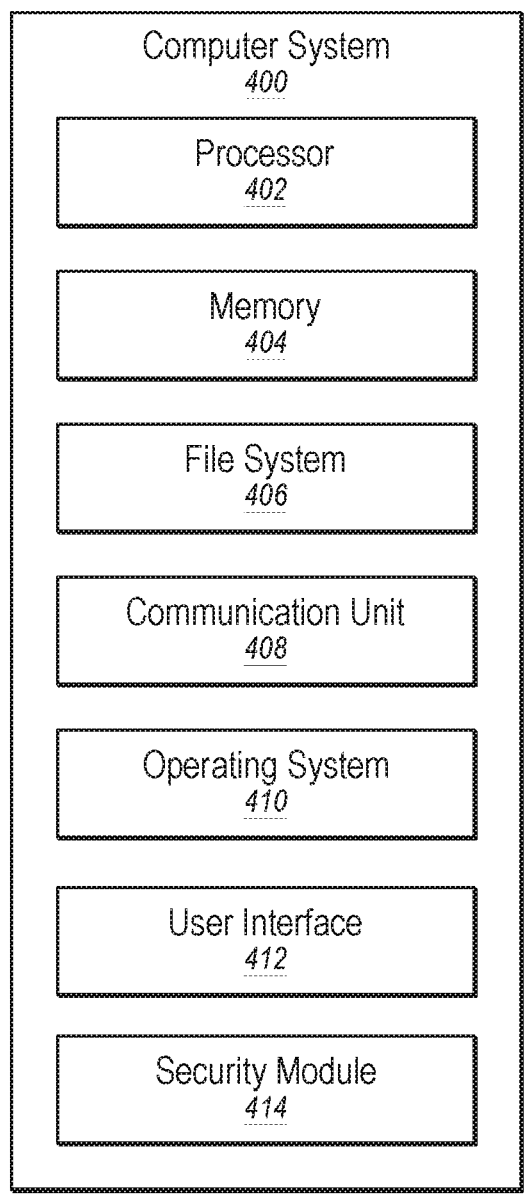
FIG. 4 illustrates an example computer system that may be employed in securing compromised network devices in a network.

In some embodiments, each of the network devices 104a-104n may be any computer system capable of communicating over the network 102, examples of which are disclosed herein in connection with the computer system 400 of FIG. 4.

In some embodiments, the security server 106 may be any computer system capable of communicating over the network 102 and capable of monitoring the network devices 104a-104n, examples of which are disclosed herein in connection with the computer system 400 of FIG. 4. In some embodiments, the security server 106 may be part of an SOC for an organization that manages the network 102 and the network devices 104a-104n. In some embodiments, the server may include a security module 108 that may be configured for securing any of the network devices 104a-104n in the network 102 that are determined to be compromised, as disclosed in greater detail in connection with FIGS. 2 and 3 herein. In some embodiments, the security module 108 may include, or have access to, training data and/or machine learning classifiers. In some embodiments, the security module 108 may include, or be part of, a User Behavior Analytics (UBA) application and/or a Security Information and Event Management (SIEM) application.

Modifications, additions, or omissions may be made to the system 100 without departing from the scope of the present disclosure. For example, in some embodiments, the system 100 may include additional components similar to the components illustrated in FIG. 1 that each may be configured similarly to the components illustrated in FIG. 1.

Figure 2:
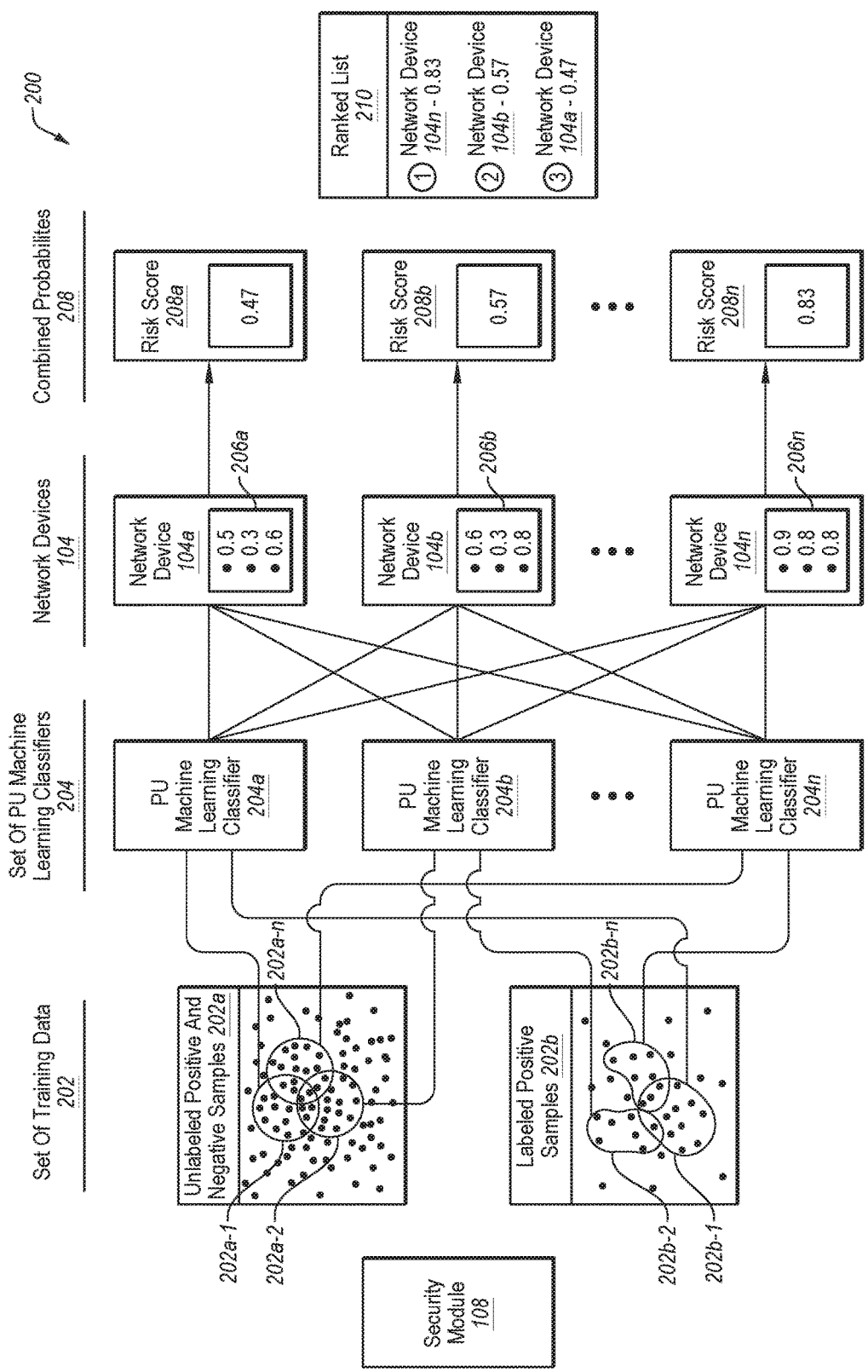
FIG. 2 is a flowchart of an example training and predicting using Positive Unlabeled (PU) machine learning classifiers.

FIG. 2 is a flowchart 200 of an example training and predicting using Positive Unlabeled (PU) machine learning classifiers. As disclosed in FIG. 2, the security module 108 may train a set of PU machine learning classifiers 204 using a set of training data 202.

The set of training data 202 may include unlabeled positive and negative samples 202a as well as labeled positive samples 202b. In some embodiments, the labeled positive samples 202b in the set of training data 202 may be collected from network devices that have been confirmed to have been compromised. In contrast, in some embodiments, the unlabeled positive and negative samples 202a in the set of training data 202 may be collected from network devices that are suspected to have been compromised but have not been confirmed to have been compromised. In some embodiments, the set of training data may include fewer labeled positive samples than unlabeled positive and negative samples due to, for example, relatively few compromised network devices actually being identified as compared to other network devices for which it is unknown whether the machines have been compromised.

The security module 108 may train the PU machine learning classifiers 204a, 204b, and 204n using bootstrap subsets of training data 202a-1 and 202b-1, 202a-2 and 202b-2, and 202a-n and 202b-n, respectively, from the set of training data 202. Obtaining a bootstrap subset may be accomplished by bootstrap sampling, where samples of the same or different sizes are repeatedly drawn with replacement from previous samples, which involves returning to the same set of training data 202 each time that a subset is chosen without the previously chosen subsets having been removed from the training data 202. Since each of these subsets is a bootstrap subset, the subsets may overlap with one another, as illustrated in FIG. 2.

Next, the security module 108 may employ the PU machine learning classifiers 204a-204n to predict probabilities, on a scale of 0 to 1 for example, that the network devices 104a-104n have been compromised. For example, the security module 108 may employ the PU machine learning classifiers 204a-204n to predict probabilities of 0.5, 0.3, and 0.6, respectively, that the network device 104a has been compromised. Similarly, the security module 108 may employ the PU machine learning classifiers 204a-204n to predict probabilities of 0.6, 0.3, and 0.8, respectively, that the network device 104b has been compromised. Further, the security module 108 may employ the PU machine learning classifiers 204a-204n to predict probabilities of 0.9, 0.8, and 0.8, respectively, that the network device 104n has been compromised. The security module 108 may then combine, by averaging for example, the probabilities for each of the network devices 104a-104n to generated combined risk scores 208a-208n of 0.47, 0.57, and 0.83, respectively, for the network devices 104a-104n. The security module 108 may then create a ranked list 210 of combined risk scores which the security module 108 and/or one or more network administrators may employ to prioritize investigations of network devices by highest combined risk score. This prioritizing may ensure that the network devices with the highest probability of actually being compromised are addressed by a network administrator, thus leaving the network 102 less vulnerable.

Modifications, additions, or omissions may be made to the example training and predicting in the flowchart 200 without departing from the scope of the present disclosure. For example, in some embodiments, the set of training data 202 may include fewer unlabeled positive and negative samples than labeled positive samples. Further, in some example, the probabilities may be expressed in another form, such as in a percentage form between 0% and 100%. Also, the security module 108 may combine the probabilities for each network device into a combined risk score using methods other than averaging, such as combining by taking the minimum or maximum of the probabilities as the combined risk score or combining by voting, that is, assigning each of the probabilities to a category and identifying the most frequent category as the combined risk score.

Figure 3:
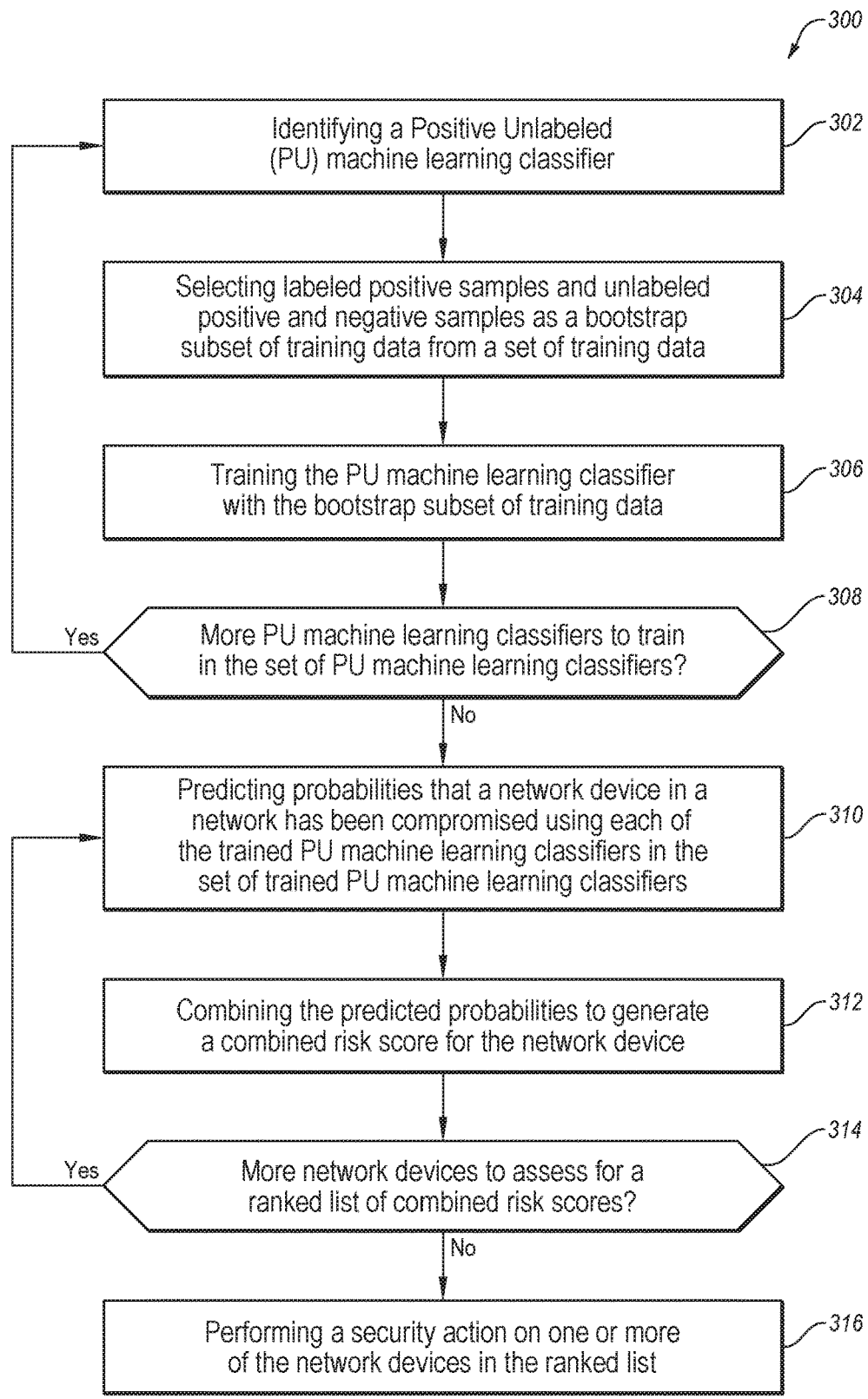
FIG. 3 is a flowchart of an example method for securing compromised network devices in a network.

FIG. 3 is a flowchart of an example method 300 for securing compromised network devices in a network. The method 300 may be performed, in some embodiments, by a device or system, such as by the security module 108 executing on the security server 106 of FIG. 1. In these and other embodiments, the method 300 may be performed by one or more processors based on one or more computer-readable instructions stored on one or more non-transitory computer-readable media. The method 300 will now be described in connection with FIGS. 1, 2, and 3.

The method 300 may include, at block 302, identifying a Positive Unlabeled (PU) machine learning classifier. For example, the security module 108 may identify, at block 302, the PU machine learning classifier 204a of FIG. 2.

The method 300 may include, at block 304, selecting labeled positive samples and unlabeled positive and negative samples as a bootstrap subset of training data from a set of training data. For example, the security module 108 may select, at block 304, labeled positive samples 202b-1 and unlabeled positive and negative samples 202a-1 as a bootstrap subset of training data from the set of training data 202 of FIG. 2.

The method 300 may include, at block 306, training the PU machine learning classifier with the bootstrap subset of training data. For example, the security module 108 may train, at block 306, the PU machine learning classifier 204a with the bootstrap subset of training data 202b-1 and 202a-1 of FIG. 2.

The method 300 may include, at decision block 308, determining whether there are more PU machine learning classifiers to train in the set of PU machine learning classifiers. If so (YES at decision block 308), the method 300 may return to block 302 and repeat blocks 302-306 one or more times on one or more additional PU machine learning classifiers to create a set of trained PU machine learning classifiers. If not (NO at decision block 308), the method 300 may continue to block 310. For example, the security module 108 may determine, at decision block 308, that there are two additional PU machine learning classifiers 204b and 204n to be trained (YES at decision block 308), and may therefore repeat blocks 302-306 in a second iteration for the PU machine learning classifier 204b and then repeat blocks 302-306 in a third iteration for the PU machine learning classifier 204n. Then, after the third iteration, the security module 108 may determine, at decision block 308, that there are no more PU machine learning classifiers to be trained in the set of PU machine learning classifiers 204 (NO at decision block 308), and may therefore continue to block 310.

In some embodiments, a type of the PU machine learning classifier identified in a first iteration of block 302 may be different from a type of the PU machine learning classifier identified in a second iteration of block 302. For example, the set of PU machine learning classifiers 204 of FIG. 2 may include, but are not limited to, one or more of a logistic regression classifier, a Linear and Quadratic Discriminant Analysis (LDA/QDA) classifier, a Support Vector Machine (SVM) classifier, a decision tree classifier, a nearest neighbor classifier, a Naïve Bayes classifier, a neural network classifier, a deep neural network classifier, a deep belief network classifier, a random forest classifier, and a gradient boosted trees classifier. In one embodiment, the PU machine learning classifier 204a may be an SVM classifier while the PU machine learning classifier 204a may be a random forest classifier. Thus, PU machine learning classifiers of different types may be employed in the method 300.

Further, in some embodiments, each iteration of block 304 may include selecting a different bootstrap subset of training data from the same set of training data. For example, during the second iteration of block 304 in the example above, the security module 108 may select a bootstrap subset of training data 202a-2 and 202b-2 that is different from the bootstrap subset of training data 202a-1 and 202b-1 that the security module 108 selected during the first iteration of the block 304. As disclosed in FIG. 2, even where the various bootstrap subsets of training data are different, they may overlap to some degree, or they may be entirely different samples that do not overlap at all.

The method 300 may include, at block 310, predicting probabilities that a network device in a network has been compromised using each of the trained PU machine learning classifiers in the set of trained PU machine learning classifiers. For example, the security module 108 may predict, at block 310, probabilities of 0.5, 0.3, and 0.6 that the network device 104a in the network 102 (of FIG. 1) has been compromised using each of the trained PU machine learning classifiers 204a-204n in the set of trained PU machine learning classifiers 204 of FIG. 2.

In some embodiments, the predicting, at block 310, of the probabilities that the network device in the network has been compromised may include predicting probabilities that the network device in the network has been infected with a malicious application. For example, a malicious application may include, but is not limited to, one or more of a spyware, a virus, a worm, a logic bomb, a trapdoor, a Trojan horse, a Remote Admin Trojan (RAT), a malware, a mobile malicious code, a malicious font, and a rootkit.

In some embodiments, the method 300 may, at block 310, use data indicating a security posture of the network device in a network as input to each of the trained PU machine learning classifiers in the set of trained PU machine learning classifiers. The data indicating the security posture of the network device may include one or more of summary feature data, indicator feature data, temporal feature data, and relational feature data.

The method 300 may include, at block 312, combining the predicted probabilities to generate a combined risk score for the network device. For example, the security module 108 may combine, at block 312, the predicted probabilities of 0.5, 0.3, and 0.6, by averaging or other method of combining such as those disclosed herein, to generate a combined risk score 208a of 0.47 for the network device 104a. In some embodiments, block 312 may also include calibrating the combined risk score into a scale for display to a user. For example, the security module 108 may calibrate, at block 312, the combined risk score 208a of 0.47 into the percentage of 47%, or into a category of "high risk," "medium risk," or "low risk," for display to a network administrator.

The method 300 may include, at decision block 314, determining whether there are more network devices to assess for a ranked list of combined risk scores. If so (YES at decision block 314), the method 300 may return to block 310 and repeat blocks 310-312 one or more times for one more or more network devices to create a ranked list of combined scores. If not (NO at decision block 314), the method 300 may continue to block 316. For example, the security module 108 may determine, at decision block 314, that there are two additional network devices 104b and 104n to be assessed (YES at decision block 314), and may therefore repeat blocks 310-312 in a second iteration for the network device 104b and then repeat blocks 310-312 in a third iteration for the network device 104n, and then create the ranked list 210 of combined risk scores of FIG. 2. Then, after the third iteration, the security module 108 may determine, at decision block 314, that there are no more network devices to be assessed (NO at decision block 314), and may therefore continue to block 316.

The method 300 may include, at block 316, performing a security action on one or more of the network devices in the ranked list. For example, where the network device 104n is positioned highest in the ranked list 210 because it has been compromised by being infected with a malicious application, the security module 108 may perform, at block 316, a security action on the network device 104n such as quarantining the malicious application, removing the malicious application, or preventing the network device 104n from communicating over the network 102 until the malicious application can be dealt with at a later time. In some embodiments, the security action may be performed, at block 316, on one or more of the network devices positioned highest in the ranked list. For example, the security module 108 may perform, at block 316, the security action on the network device 104n since it is positioned highest in the ranked list 210 of FIG. 2. Further, in some embodiments, block 316 may further include presenting the ranked list of combined risk scores to a user. For example, the security module 108 may present, at block 316, the ranked list 210 of combined risk scores to a network administrator.

In some embodiments, the method 300 may ensure that the network devices with the highest probability of actually being compromised are addressed by a security module or a network administrator. This may allow the limited time, energy, and resources of a security module or of a limited number of network administrators to be utilized in a more effective manner than conventional investigations that are random or based on a rudimentary rules-based ranking, thus leaving the network less vulnerable.

Although the blocks of the method 300 are illustrated in FIG. 3 as discrete blocks, various blocks may be divided into additional blocks, combined into fewer blocks, reordered, expanded, or eliminated, depending on the desired implementation. For example, in some embodiments, blocks 302-308 may be performed without performing blocks 310-316, or blocks 310-316 may be performed without performing blocks 302-308. Also, in some embodiments, block 316 may be eliminated or may be performed by a network administrator or other entity that is different from the entity performing the other blocks of the method 300. Further, in some embodiments, blocks 302-308 may be performed in parallel with the performance of one or more of blocks 310-316.

Further, it is understood that the method 300 may improve the functioning of a network environment. For example, the functioning of the security server 106 or any of the network devices 104a-104n of FIG. 1 may itself be improved by the method 300. For example, any of these computer systems may be improved by training Positive Unlabeled (PU) machine learning classifiers using training data that includes both labeled positive samples and unlabeled positive and negative samples, employing the PU machine learning classifiers to predict probabilities that one or more network devices in a network have been compromised, combining the predicted probabilities for each network device into a combined risk score for each network device, and then placing the combined risk scores for the network devices in a ranked list, thus ensuring that the network devices with the highest probability of actually being compromised are addressed by a security module or a network administrator. The method 300 may thus result in the securing of compromised network devices in a network in a more effective manner than conventional investigations into potentially compromised network devices that are random or based on a rudimentary rules-based ranking. Further, unlike conventional attempts at selecting which network devices to investigate randomly or based on a rudimentary rules-based ranking, the method 300 may improve the functioning of selecting network devices to investigate by using machine learning classifiers to produce a ranked list of network devices.

Also, the method 300 may improve the technical field of detecting and securing compromised network devices. Employing bootstrap subsets of training data to train multiple PU machine learning classifiers, and then employing the multiple PU machine learning classifiers to predict the probabilities of network devices being compromised to ultimately create a ranked list of network devices, is an improvement over conventional attempts at selecting which network devices to investigate that are random or based on a rudimentary rules-based ranking.

FIG. 4 illustrates an example computer system 400 that may be employed in securing compromised network devices in a network. In some embodiments, the computer system 400 may be part of any of the systems or devices described in this disclosure. For example, the computer system 400 may be part of any of the network devices or the security server devices of FIGS. 1 and 2.

The computer system 400 may include a processor 402, a memory 404, a file system 406, a communication unit 408, an operating system 410, a user interface 412, and a security module 414, which all may be communicatively coupled. In some embodiments, the computer system may be, for example, a desktop computer, a client computer, a server computer, a mobile phone, a laptop computer, a smartphone, a smartwatch, a tablet computer, a portable music player, or any other computer system.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data, or any combination thereof. In some embodiments, the processor 402 may interpret and/or execute program instructions and/or process data stored in the memory 404 and/or the file system 406. In some embodiments, the processor 402 may fetch program instructions from the file system 406 and load the program instructions into the memory 404. After the program instructions are loaded into the memory 404, the processor 402 may execute the program instructions. In some embodiments, the instructions may include the processor 402 performing one or more blocks of the method 300 of FIG. 3.

The memory 404 and the file system 406 may include computer-readable storage media for carrying or having stored thereon computer-executable instructions or data structures. Such computer-readable storage media may be any available non-transitory media that may be accessed by a general-purpose or special-purpose computer, such as the processor 402. By way of example, and not limitation, such computer-readable storage media may include non-transitory computer-readable storage media including Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage media which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations, such as one or more blocks of the method 300 of FIG. 3. These computer-executable instructions may be included, for example, in the operating system 410, in one or more applications, such as the security module 414, or in some combination thereof.

The communication unit 408 may include any component, device, system, or combination thereof configured to transmit or receive information over a network, such as the network 102 of FIG. 1. In some embodiments, the communication unit 408 may communicate with other devices at other locations, the same location, or even other components within the same system. For example, the communication unit 408 may include a modem, a network card (wireless or wired), an infrared communication device, a wireless communication device (such as an antenna), and/or chipset (such as a Bluetooth device, an 802.6 device (e.g., Metropolitan Area Network (MAN)), a WiFi device, a WiMax device, a cellular communication device, etc.), and/or the like. The communication unit 408 may permit data to be exchanged with a network and/or any other devices or systems, such as those described in the present disclosure.

The operating system 410 may be configured to manage hardware and software resources of the computer system 400 and configured to provide common services for the computer system 400.

The user interface 412 may include any device configured to allow a user to interface with the computer system 400. For example, the user interface 412 may include a display, such as an LCD, LED, or other display, that is configured to present video, text, application user interfaces, and other data as directed by the processor 402. The user interface 412 may further include a mouse, a track pad, a keyboard, a touchscreen, volume controls, other buttons, a speaker, a microphone, a camera, any peripheral device, or other input or output device. The user interface 412 may receive input from a user and provide the input to the processor 402. Similarly, the user interface 412 may present output to a user.

The security module 414 may be one or more computer-readable instructions stored on one or more non-transitory computer-readable media, such as the memory 404 or the file system 406, that, when executed by the processor 402, is configured to perform one or more blocks of the method 300 of FIG. 3. In some embodiments, the security module 414 may be part of the operating system 410 or may be part of an application of the computer system 400, or may be some combination thereof. In some embodiments, the security module 414 may function as the security module 108 of FIGS. 1 and 2.

Modifications, additions, or omissions may be made to the computer system 400 without departing from the scope of the present disclosure. For example, although each is illustrated as a single component in FIG. 4, any of the components 402-414 of the computer system 400 may include multiple similar components that function collectively and are communicatively coupled. Further, although illustrated as a single computer system, it is understood that the computer system 400 may include multiple physical or virtual computer systems that are networked together, such as in a cloud computing environment, a multitenancy environment, or a virtualization environment.

As indicated above, the embodiments described herein may include the use of a special purpose or general purpose computer (e.g., the processor 402 of FIG. 4) including various computer hardware or software modules, as discussed in greater detail below. Further, as indicated above, embodiments described herein may be implemented using computer-readable media (e.g., the memory 404 or file system 406 of FIG. 4) for carrying or having computer-executable instructions or data structures stored thereon.

In some embodiments, the different components and modules described herein may be implemented as objects or processes that execute on a computing system (e.g., as separate threads). While some of the methods described herein are generally described as being implemented in software (stored on and/or executed by general purpose hardware), specific hardware implementations or a combination of software and specific hardware implementations are also possible and contemplated.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A computer-implemented method for securing compromised network devices in a network, at least a portion of the method being performed by a computing device comprising at least one processor, the method comprising:
   (a) identifying a Positive Unlabeled (PU) machine learning classifier;
   (b) selecting labeled positive samples and unlabeled positive and negative samples as a bootstrap subset of training data from a set of training data;

(c) training the PU machine learning classifier with the bootstrap subset of training data;
(d) repeating (a)-(c) one or more times to create a set of trained PU machine learning classifiers;
(e) predicting probabilities that a network device in a network has been compromised using each of the trained PU machine learning classifiers in the set of trained PU machine learning classifiers;
(f) combining the probabilities predicted at (e) to generate a combined risk score for the network device;
(g) repeating (e)-(f) one or more times to create a ranked list of combined risk scores; and
(h) performing a security action on one or more of the network devices in the ranked list.

2. The method of claim 1, wherein a type of the PU machine learning classifier identified in a first iteration of (a) is different from a type of the PU machine learning classifier identified in a second iteration of (a).

3. The method of claim 1, wherein the PU machine learning classifier identified at (a) comprises one or more of a logistic regression classifier, a Linear and Quadratic Discriminant Analysis (LDA/QDA) classifier, a Support Vector Machine (SVM) classifier, a decision tree classifier, a nearest neighbor classifier, a Naïve Bayes classifier, a neural network classifier, a deep neural network classifier, a deep belief network classifier, a random forest classifier, and a gradient boosted trees classifier.

4. The method of claim 1, wherein the PU machine learning classifier identified at (a) comprises one or more of a Support Vector Machine (SVM) classifier and a random forest classifier.

5. The method of claim 1, wherein the predicting of the probabilities that the network device in the network has been compromised comprises predicting probabilities that the network device in the network has been infected with a malicious application.

6. The method of claim 5, wherein the malicious application comprises one or more of a spyware, a virus, a worm, a logic bomb, a trapdoor, a Trojan horse, a Remote Admin Trojan (RAT), a malware, a mobile malicious code, a malicious font, and a rootkit.

7. The method of claim 1, wherein each iteration of (b) comprises selecting a different bootstrap subset of training data from the same set of training data.

8. The method of claim 1, wherein (h) comprises performing the security action on one or more of the network devices positioned highest in the ranked list.

9. A computer-implemented method for securing compromised network devices in a network, at least a portion of the method being performed by a computing device comprising at least one processor, the method comprising:
(a) identifying a Positive Unlabeled (PU) machine learning classifier;
(b) selecting labeled positive samples and unlabeled positive and negative samples as a bootstrap subset of training data from a set of training data, the set of training data comprising fewer labeled positive samples than unlabeled positive and negative samples;
(c) training the PU machine learning classifier with the bootstrap subset of training data;
(d) repeating (a)-(c) one or more times to create a set of trained PU machine learning classifiers, with each iteration of (b) comprising selecting a different bootstrap subset of training data from the same set of training data;
(e) predicting probabilities that a network device in a network has been compromised using each of the trained PU machine learning classifiers in the set of trained PU machine learning classifiers;
(f) combining the probabilities predicted at (e) to generate a combined risk score for the network device;
(g) repeating (e)-(f) one or more times to create a ranked list of combined risk scores; and
(h) performing a security action on one or more of the network devices in the ranked list.

10. The method of claim 9, wherein (e) comprises using data indicating a security posture of the network device in a network as input to each of the trained PU machine learning classifiers in the set of trained PU machine learning classifiers.

11. The method of claim 10, wherein the data indicating the security posture of the network device comprises one or more of summary feature data, indicator feature data, temporal feature data, and relational feature data.

12. The method of claim 9, wherein (f) comprises combining the probabilities predicted at (e) by averaging the probabilities as the combined risk score for the network device.

13. The method of claim 9, wherein (f) comprises combining the probabilities predicted at (e) by taking the minimum or maximum of the probabilities as the combined risk score for the network device.

14. The method of claim 9, wherein (f) comprises combining the probabilities predicted at (e) by assigning each of the probabilities to a category and identifying the most frequent category as the combined risk score for the network device.

15. One or more non-transitory computer-readable media comprising one or more computer-readable instructions that, when executed by one or more processors of one or more computing devices, cause the one or more computing devices to perform a method comprising:
(a) identifying a Positive Unlabeled (PU) machine learning classifier;
(b) selecting labeled positive samples and unlabeled positive and negative samples as a bootstrap subset of training data from a set of training data;
(c) training the PU machine learning classifier with the bootstrap subset of training data;
(d) repeating (a)-(c) one or more times to create a set of trained PU machine learning classifiers;
(e) predicting probabilities that a network device in a network has been compromised using each of the trained PU machine learning classifiers in the set of trained PU machine learning classifiers;
(f) combining the probabilities predicted at (e) to generate a combined risk score for the network device;
(g) repeating (e)-(f) one or more times to create a ranked list of combined risk scores; and
(h) performing a security action on one or more of the network devices in the ranked list.

16. The one or more non-transitory computer-readable media of claim 15, wherein:
the labeled positive samples in the set of training data are collected from network devices that have been confirmed to have been compromised; and
the unlabeled positive and negative samples in the set of training data are collected from network devices that are suspected to have been compromised but have not been confirmed to have been compromised.

17. The one or more non-transitory computer-readable media of claim 15, wherein (f) further comprises calibrating the combined risk score into a scale for display to a user.

18. The one or more non-transitory computer-readable media of claim 15, wherein the method is performed in a User Behavior Analytics (UBA) application.

19. The one or more non-transitory computer-readable media of claim 15, wherein the method is performed in a Security Information and Event Management (SIEM) application.

20. The one or more non-transitory computer-readable media of claim 15, wherein (g) further comprises presenting the ranked list of combined risk scores to a user.

* * * * *